Nov. 19, 1968     B. J. PANEK ET AL     3,411,279

FLAIL KNIFE ASSEMBLY

Filed July 21, 1965     2 Sheets-Sheet 1

Inventors.
Bruno J. Panek
Robert W. Woodring

John J. Kowalik
Atty.

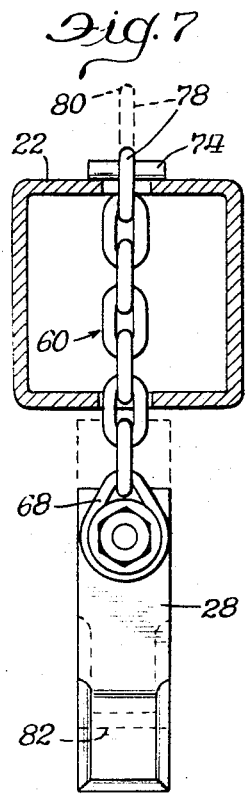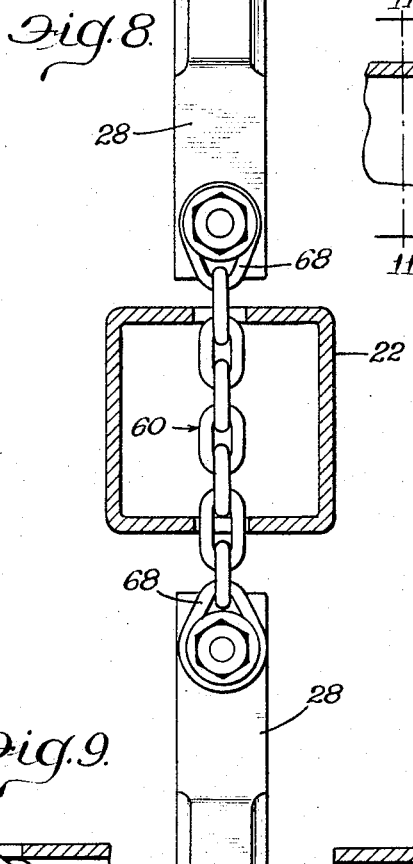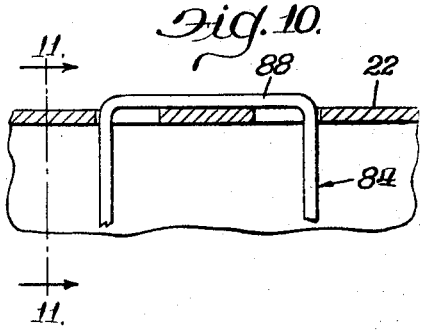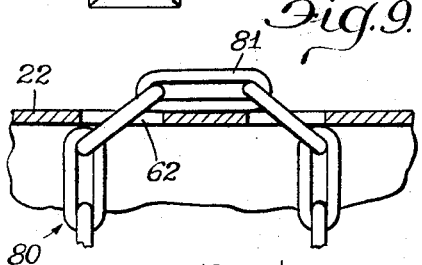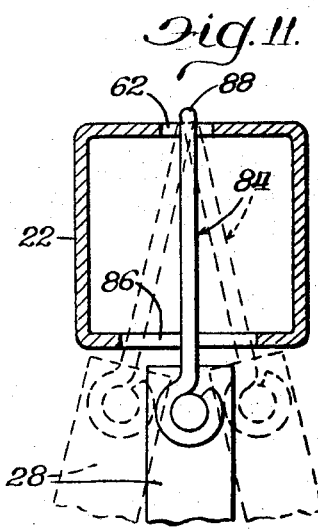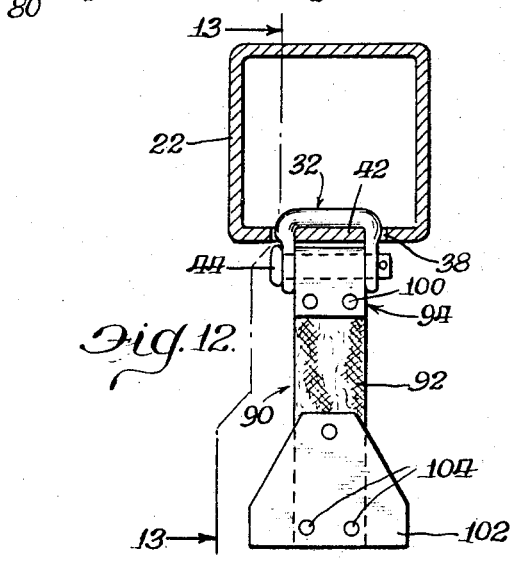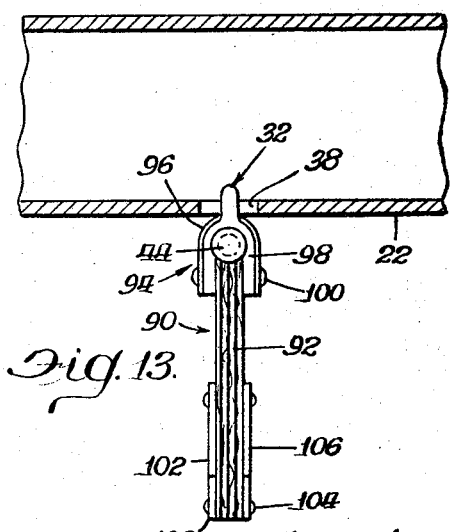

United States Patent Office 3,411,279
Patented Nov. 19, 1968

3,411,279
FLAIL KNIFE ASSEMBLY
Bruno J. Panek, Chicago, and Robert W. Woodring, La Grange, Ill., assignors to International Harvester Company, a corporation of Delaware
Filed July 21, 1965, Ser. No. 473,660
10 Claims. (Cl. 56—294)

ABSTRACT OF THE DISCLOSURE

A flail knife assembly having a holder and mounting means extending through apertures in the holder and connected to knife means.

---

The present invention relates to a flail knife assembly and particularly such an assembly adapted for use in a mower.

A mower of the type to which the present flail knife assembly is particularly adapted includes a rotor or rotary holder extending transverse to the direction of movement of the mower, the holder having a plurality of flail knives thereon which fly out in response to the rotation of the holder.

A broad object of the invention is to provide a flail knife assembly of the foregoing general character of novel construction especially adapted to adjustment thereof on the holder for varying its operating characteristics.

Another and more specific object is to provide a flail knife assembly of novel articulated and flexible character, resulting in distribution and spreading of the wear experienced by the assembly in the normal use thereof, whereby to eliminate more intense wear at localized areas, resulting in longer life of the assembly.

Another object is to provide a flail knife assembly having such adjustability characteristics as to enable and facilitate varying the effect of length of the knife assembly.

Still another object is to provide a flail knife assembly including knives and novel means for mounting them on the holder, as to enable mounting knives on diametrically opposite ends of a single holder, thereby assisting in balancing the knife arrangement on the holder.

A further advantage of the arrangement just referred to is that, since the knives are mounted on opposite ends of a single holder, a minimum number of mounting means are utilized for mounting a given number of knives, and the mounting means are of a simpler character.

A further object is to provide a flail knife assembly of the foregoing general character having such flexibility characteristics as to facilitate yielding of the knives upon encountering obstacles in the normal use of the mower in which they are incorporated.

Still another object is to provide a flail knife assembly which is made of readily available materials and is easy to apply to the holder and replace on the holder.

Other objects and advantages of the invention will appear from the following detail description taken in conjunction with the accompanying drawings in which:

FIGURE 7 is a small scale view of a device forming a slight modification of that shown in FIGURES 5 and 6;

FIGURE 8 is a small scale view showing another slight modification of the device shown in FIGURES 5 and 6;

FIGURE 9 is a fragmentary view of a further embodiment of the invention;

FIGURE 10 is a fragmentary view of still another embodiment of the invention;

FIGURE 11 is a view taken at line 11—11 of FIGURE 10, but including a greater portion thereof;

FIGURE 12 is a view oriented according to FIGURES 3 and 5, showing a further embodiment of the invention; and FIGURE 13 is a view taken at line 13—13 of FIGURE 12.

Figure 1:
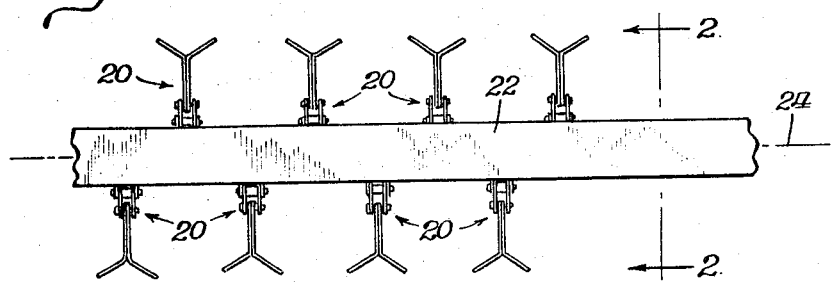
FIGURE 1 is a side view, in small scale, of a portion of the holder on which a plurality of flail knife assemblies are mounted, and shows certain of such assemblies thereon.
Figure 2:
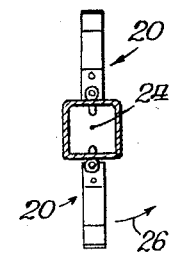
FIGURE 2 is a view taken at line 2—2 of FIGURE 1.

Referring now in detail to the drawings, attention is directed first to FIGURES 1 and 2 showing in small scale the flail knife assembly of the present invention mounted on a rotor or holder in the mower. The knife assembly as indicated in its entirety at 20 and the holder at 22. The holder 22 is of tubular form and preferably square in cross section and is mounted in the mower transverse to the direction of movement of the mower, and in the operation of the mower rotates on its longitudinal axis indicated at 24. A plurality of flail knife assemblies 20 are shown spaced along the holder at suitable intervals. Upon rotation of the holder the flail knives fly out to a position approximating the radial, in a known manner, working in planes perpendicular to the axis 24 as indicated by the arrow 26 in FIGURE 2.

Figure 3:
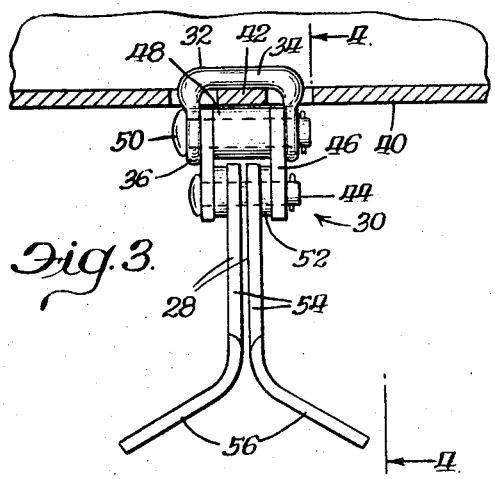
FIGURE 3 is a large scale sectional view taken at lines 3—3 of FIGURE 2 and thus oriented according to FIGURE 1.
Figure 4:
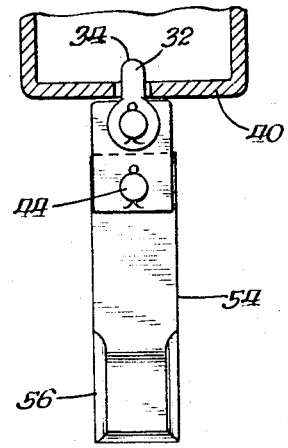
FIGURE 4 is a view taken at line 4—4 of FIGURE 3.

Attention is now directed to FIGURES 3 and 4 showing one embodiment of the invention, and that shown in small scale in FIGURES 1 and 2. The flail assembly 20 includes a pair of knives 28 mounted on the holder 22 by a novel mounting means 30 which includes a U-shaped link 32 secured directly to the holder 22. The link 32 includes a central web portion 34 and legs 36 in the form of eyelets. The legs 36 extend outwardly through apertures 38 in an element 40 of the wall of the holder, these apertures 38 being spaced apart with a connecting piece 42 therebetween engaged by the web element 34.

The outer diameter of the eyelets 36 is slightly less than the diameter, or transverse dimension, of the apertures 38, to enable "threading" of the link into position i.e., one leg is inserted inwardly through one of the apertures and then moved across to the other aperture and extended outwardly through that other aperture, thus enabling the link to be put in position at intermediate positions along the length of the holder to avoid the use of special tools. Preferably the apertures 38 are round, to economize in forming them, as by drilling, but of course other shapes of apertures are permissible. The size of the apertures 38 enables rocking, or limited pivoting movement, of the link 32 on the holder on a line extending in the direction of the web element 34 and between that element and the connecting piece 42.

A pin 44 is inserted through the eyelets 36 and through a pair of links 46 and a spacer 48 between the links. Another pin 50 is inserted through in the other ends of the links 46 and through spacers 52 and through apertures in the inner ends of the knives 28. The knives 28 may be of any suitable kind having mounting portions 54 and cutting portions 56 disposed at an angle to the mounting portions.

The mounting means 30 is articulated and effectively flexible, providing a plurality of axes about which parts of the knife assembly can flex or articulate. In the present case three such lines or axes are provided, namely, that between the web element 34 and the connecting piece 42, that provided by the pin 44, and that provided by the pin 50. In addition to the flexibility or articulation provided, a simple mounting means results and the mounting means can be easily and quickly applied as by the user of the mower when it is desired to remove and replace the knives.

Figures 5, 6:
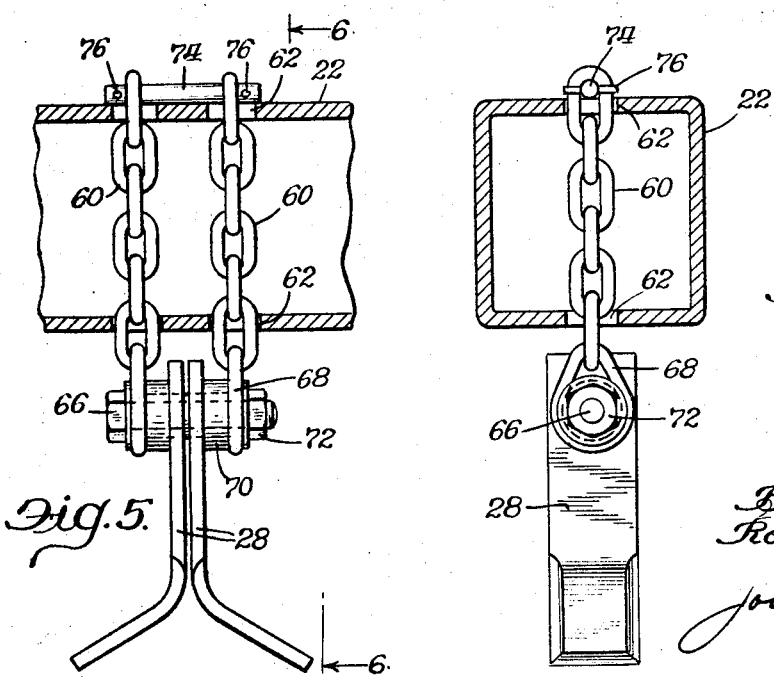
FIGURE 5 is a view similar to FIGURE 3 but showing a second embodiment of the invention.
FIGURE 6 is a view taken at line 6—6 of FIGURE 5.

FIGURES 5 and 6 show a modified form of mounting means indicated in its entirety at 58, mounting suitable knives which may be the same kind as the knives 28 above described. The mounting means 58 includes a pair of link chains 60 extending through a pair of apertures 62 in each of opposite wall elements 64 and 65 of the holder 22. The knives 28 are directly mounted on a bolt 66 extending through the outer links 68 of the chains, which may be enlarged for adapting to mounting the knives. The bolt extends through spacers 70 and then through apertures in the inner ends of the knives, a nut 72 being threaded on the bolt.

On the opposite side of the holder, a pin 74 is inserted through the end links of the chains and bears against the outer surface of the holder. The pin 74 may be held in place by suitable means such as cutter pins 76.

The construction shown in FIGURES 5 and 6 also provides a high degree of flexibility or articulation, there being flexing or pivoting or rocking movement between those links of the chain outwardly of the holder, and at the plane of the wall element 64, and even inwardly of that wall element. Additional pivoting action is also enabled about the axis of the bolt 66. The present construction is advantageous in that simple and strong mounting means is provided, and one utilizing readily available and inexpensive materials. A further advantage is that the two, axially spaced, chains enable twisting of the knife assembly and more effective yielding in encountering obstacles.

FIGURE 7 shows a slight modification of the arrangement shown in FIGURES 5 and 6. In the construction of FIGURE 7 each chain 60 may be provided with an elongated link 78 at its end opposite the knives and selectively, a pin 74 may be utilized as described above, or a larger block or spacer 80 instead of the pin, drawing the chain in corresponding direction, and drawing the knives 28 radially inwardly. Blocks or spacers 80 of various dimensions may be utilized for selectively using those of suitable dimensions for spacing the knives 28 relative to the holder and thus adjusting or varying their effective length. The dot-dash line 82 in FIGURE 7 indicates the outer limit of the knives when the latter are adjusted to an inner position as just described. The inner adjusted positions of the knives 28 also aid in balancing the knife assembly relative to the rotation of the holder and knives.

FIGURE 8 shows an arrangement in which knives 28 are mounted on both ends of the chains, the chains having special links 68 at both ends for so mounting the knives. In the present instance the mounting means provides a simple arrangement for mounting the knives, and a less expensive mounting means for any given number of knives. Also in this arrangement greater balancing effect is achieved by the knives being weighted against each other in diametrically opposite positions.

In FIGURE 9, the arrangement is similar to that of FIGURES 5 and 6 except that instead of a pair of chains 60 a single chain 81 is provided, of greater length, having a looped portion 82, and with the ends of the chain extending through the apertures in the holder, where the knives 28 are mounted in the ends of the chain. In this case it is also possible to utilize spacers such as 80 (FIGURE 7) in the looped portion 82 of the single chain 81. Flexibility and articulation are provided as in the case of the device of FIGURES 5 and 6.

The device of FIGURES 10 and 11 is similar to that of FIGURE 9 except that instead of a single chain 81, a single U-shaped rod or bolt 84 is utilized in the same manner as the single chain. In this case also spacers 80 of different dimensions may be utilized for adjustably positioning the knives radially of the holder.

Another manner in which flexibility and articulation may be provided is to provide transversely elongated apertures 86 as shown in FIGURES 10 and 11 enabling the U-shaped bolt 84 to swing in the direction of the length of the apertures, the bolt then rocking or pivoting about a line between the closed end 88 of the U-shaped bolt and the adjacent wall element of the holder. Thus flexibility and articulation are provided in the present instance on the line just referred to, and on a line or axis at the point of connection of the knives to the U-shaped bolt.

FIGURES 12 and 13 illustrate an additional embodiment of the invention providing an infinite degree of flexibility and articulation of the knives. In the present instance the knife assembly includes a single knife 90 which includes a shank 92 made of flexible and yieldable material such for example as an element cut from a pneumatic tire carcass, such as an automobile tire. Such a tire as is well known includes rubber or a rubber like material and reinforcing fibers, and provides a high degree of flexibility throughout its length. The shank 90 may be for example about as wide as known knives such as the knives 28 and its inner end is provided with a U-shaped clip 24 which may be of suitable kind such as an outer metal element 96 and an inner element 98 of resilient material. The clip 94 is attached to the holder 22 by a U-shaped link 32 described in connection with FIGURES 3 and 4, the pin 44 being received within the clip 94. This clip is secured to the shank 92 as by rivets 100.

A knife blade 102 is secured to the outer end of the shank 90 as by rivets 104, the rivets also extending through a back-up plate 106 on the opposite side of the shank. The knife blade 102 may be of any desired shape and size, having a cutting edge 108 on its radially extreme edge. The back-up plate 106 may be merely as wide as the shank 92 and thus used only for strengthening purposes, or if desired it may be in the form of a knife blade such as 102, and in the latter case the knife can be reversed for presenting the second knife blade for cutting when the first one becomes dulled.

The construction of FIGURES 12 and 13 provides pivoting or rocking action between the link 32 and the wall element of the holder, and also about the pin 44. In addition the shank 92 provides an infinite degree of flexing. Further advantages are that the shank is extremely tough and long-wearing, and it as well as other elements of the construction, are very inexpensive and all readily available.

Although certain preferred forms of the invention are described and claimed herein it will be understood that changes may be made therein within the spirit and scope of the appended claims.

We claim:

1. A flail knife assembly adapted for mounting on a tubular holder having a surrounding wall and mounted for rotation on its central longitudinal axis, the combination comprising, a U-shape link having a central web element inwardly of the wall and legs extending through apertures to the wall, and knives pivoted in the legs of the link on a line parallel with the axis of rotation of the holder, said link also being enabled to rock about a line between said web element and the associated element of the wall of the holder, said last line also being generally parallel with said axis.

2. The invention set out in claim 1 wherein additional links are pivoted in the legs of said U-shape link, and the knives are pivoted in the extended ends of said additional links, whereby to provide flexibility and articulation between the knives and said U-shape link along a plurality of lines parallel with said axis.

3. A flail knife assembly adapted for mounting on an elongated holder itself mounted for rotation about its longitudinal axis, comprising, in combination, mounting means extending transversely through the holder and freely slidable therethrough and knives pivotally mounted at opposite ends of the mounting means exteriorly of the holder.

4. A flail knife assembly adapted for mounting on an elongated holder itself mounted for rotation about its longitudinal axis, comprising, in combination, mounting means extending transversely through the holder, knives having cutting portions at outer ends thereof, and the knives at their inner ends being pivotally mounted in one end of the mounting means exteriorly of the holder, said mounting means and its connection with the knives providing flexibility and articulation at a plurality of points from the point of supporting reaction between said mounting means and the holder to the knives, said mounting means being of U-shape and having spaced legs extending through apertures in the holder and a central bight portion engaging the outer surface of the holder on the side of the holder opposite the knives.

5. A flail knife assembly adapted for mounting on an elongated holder itself mounted for rotation about its longitudinal axis, comprising, in combination, mounting means extending transversely through the holder, knives having cutting portions at outer ends thereof, and the knives at their inner ends being pivotally mounted in one end of the mounting means exteriorly of the holder, said mounting means and its connection with the knives providing flexibility and articulation at a plurality of points from the point of supporting reaction between the mounting means and the holder to the knives, said mounting means being of U-shape having spaced legs extending through apertures in the holder and a central bight portion engaging the outer surface of the holder on the side of the holder opposite the knives and said mounting means being in the form of a link chain.

6. A flail knife assembly adapted for mounting on an elongated holder itself mounted for rotation about its longitudinal axis, comprising, in combination, mounting means extending transversely through the holder, knives having cutting portions at outer ends thereof and the knives at their inner ends being pivotally mounted in one end of the mounting means exteriorly of the holder, said mounting means and its connection with the knives providing flexibility and articulation at a plurality of points from the point of supporting reaction between the elongated holder and mounting means to the knives and said mounting means being of U-shape having spaced legs extending through apertures in the holder and a central bight portion engaging the outer surface of the holder on the side of the holder opposite the knives, said U-shape mounting means being in the form of a rigid rod, and the apertures in the holder spaced apart longitudinally of the holder and those on the side of the holder adjacent the knives being elongated in direction transverse to the holder whereby to enable swinging movement of the U-shaped mounting means about a line between the bight portion and the holder on the side opposite the knives.

7. A flail knife assembly adapted for mounting on an elongated tubular holder having a surrounding wall, the holder itself being mounted for rotation about its central longitudinal axis, comprising, in combination, link chain means extending transversely through the holder and having ends exteriorly thereof, through apertures in opposite wall elements of the holder and freely slidable therethrough, a knife at each end of said chain means, said knives having cutting portions at their outer ends.

8. A flail knife assembly adapted for mounting on an elongated tubular holder having a surrounding wall, the holder itself being mounted for rotation about its central longitudinal axis, comprising, in combination, link chain means extending transversely through the holder, through apertures in opposite wall elements of the holder, knives having cutting portions at outer ends pivotally mounted at their inner ends in one end of the chain means exteriorly of the holder and wherein the chain means includes a pair of chains, and pin means is mounted in the ends of the chains opposite the knives exteriorly of the holder, and bears against the exterior surface of the holder and thereby secured the chains and knives in mounted position.

9. A flail knife assembly adapted for mounting on an elongated tubular holder having a surrounding wall, the holder itself being mounted for rotation about its central longitudinal axis, comprising, in combination, link chain means extending transversely through the holder, through apertures in opposite wall elements of the holder, knives having cutting portions at outer ends pivotally mounted at their inner ends in one end of the chain means exteriorly of the holder and wherein the chains at the ends opposite the knives include elongated links whereby to enable the insertion selectively of pin means of various dimensions and thereby adjustably positioning the chains and knives correspondingly outwardly and inwardly radially of the holder.

10. A flail knife assembly adapted for mounting on an elongated holder mounted for rotation about its central longitudinal axis comprising, a knife, means securing the knife at one end to the holder comprising an element providing an axis of pivot extending transversely of the longitudinal axis of said holder and accommodating pivotal movement of the knife assembly axially of the holder, said knife assembly having a shank of flexible elastomer material and extending edgewise in the direction of rotation of the holder, and a knife blade secured to the outer end of the shank of greater width than the width of the shank.

References Cited

UNITED STATES PATENTS

| | | | |
|---|---|---|---|
| 2,506,054 | 5/1950 | Agee et al. | 56—29 XR |
| 2,691,262 | 10/1954 | Swertfeger | 56—29 XR |
| 2,938,326 | 5/1960 | Lundell | 56—504 |
| 2,974,888 | 3/1961 | Everett | 241—191 |
| 3,122,871 | 3/1964 | Frevik et al. | 56—294 |

FOREIGN PATENTS 1,117,935   11/1961   Germany.

ANTONIO F. GUIDA, *Primary Examiner.*